Figures 3, 4:
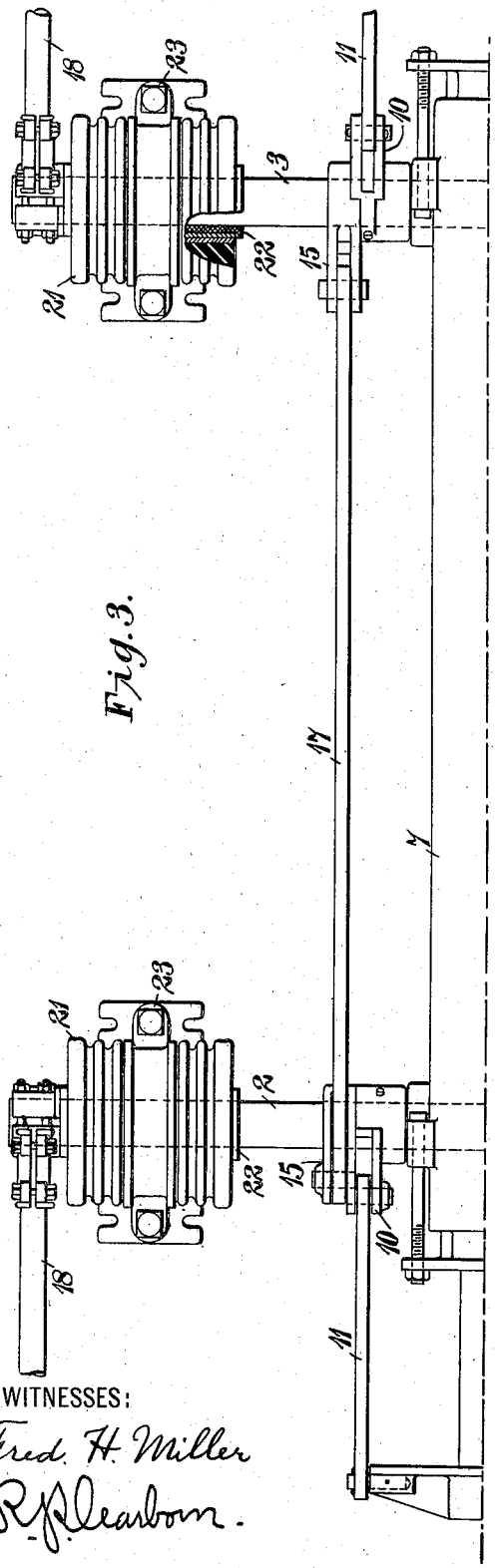

T. VARNEY.
TROLLEY.
APPLICATION FILED JAN. 16, 1906.
932,651.
Patented Aug. 31, 1909.
3 SHEETS—SHEET 1.
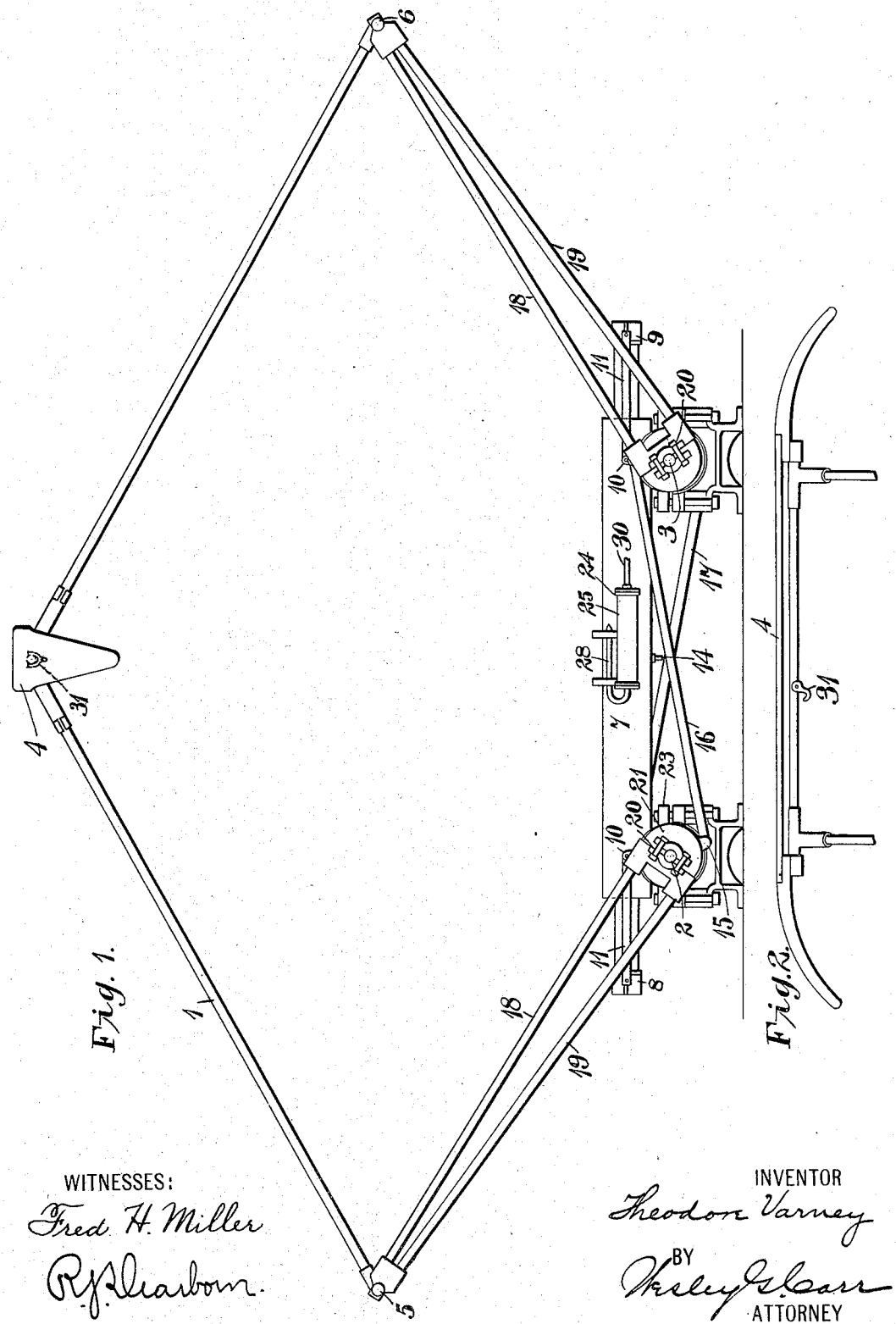
WITNESSES:
Fred H. Miller
R. J. Dearborn
INVENTOR
Theodore Varney
BY
Wesley S. Carr
ATTORNEY

T. VARNEY.
TROLLEY.
APPLICATION FILED JAN. 16, 1906.

932,651.

Patented Aug. 31, 1909.
3 SHEETS—SHEET 2.

WITNESSES:
Fred. H. Miller
R. P. Dearborn.

INVENTOR
Theodore Varney
BY
Chesley G. Carr
ATTORNEY

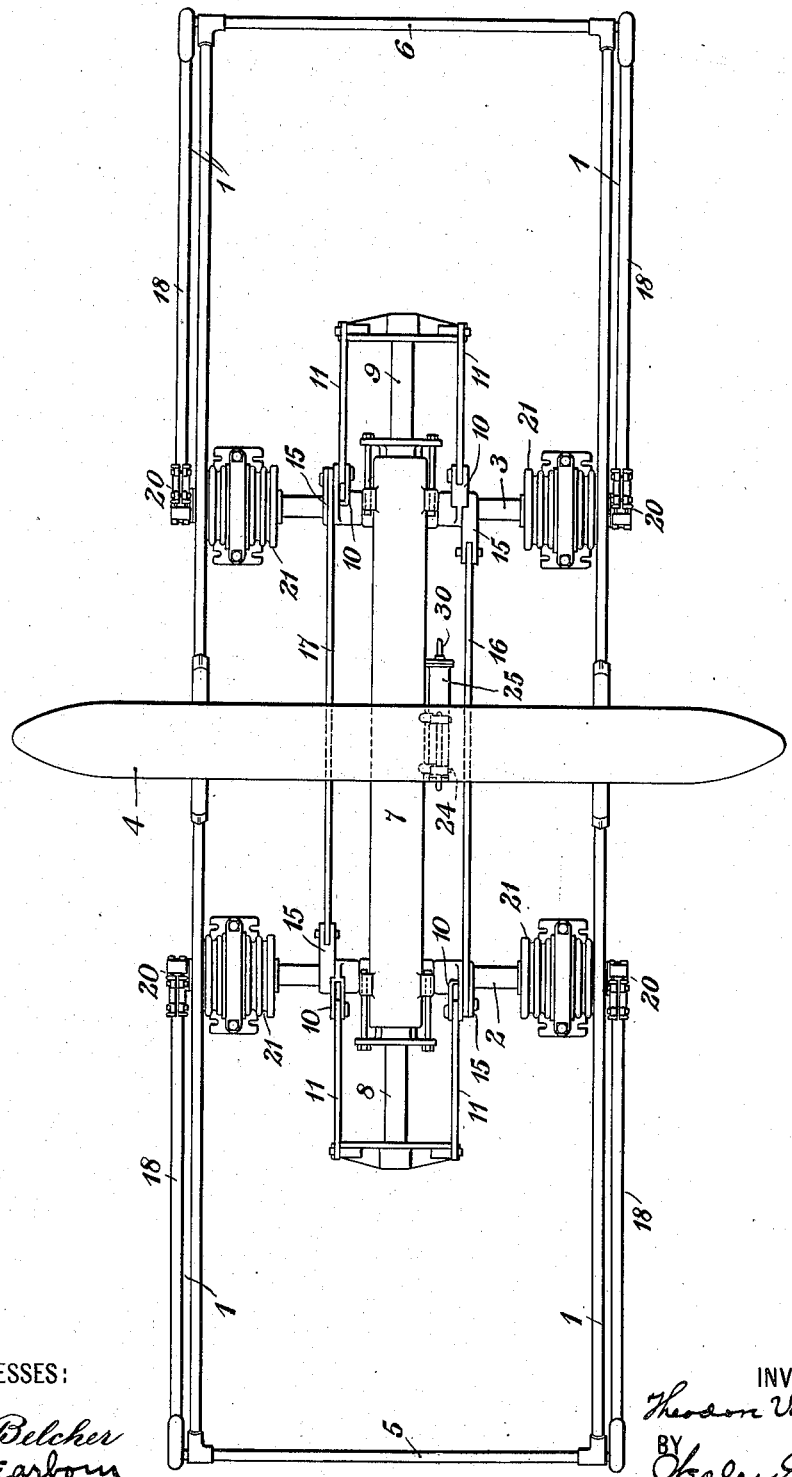

UNITED STATES PATENT OFFICE.

THEODORE VARNEY, OF PITTSBURG, PENNSYLVANIA, ASSIGNOR TO WESTINGHOUSE ELECTRIC & MANUFACTURING COMPANY, A CORPORATION OF PENNSYLVANIA.

TROLLEY.

932,651.      Specification of Letters Patent.      Patented Aug. 31, 1909.

Application filed January 16, 1906. Serial No. 296,318.

*To all whom it may concern:*

Be it known that I, THEODORE VARNEY, a citizen of the United States, and a resident of Pittsburg, in the county of Allegheny and State of Pennsylvania, have invented a new and useful Improvement in Trolleys, of which the following is a specification.

My invention relates to trolleys for electrically propelled vehicles and it has for its object to provide a device of this character, suitable for high speed operation, that may be held in contact with the trolley conductor by spring action and be lowered by pneumatic pressure and retained in such position by a pneumatically operated latch device, the supply of fluid-pressure being under the control of the vehicle driver or motorman.

Trolleys of the pantograph frame construction, such as the trolley described in Patent No. 801,226, granted to the Westinghouse Electric & Manufacturing Company, as assignee of H. P. Davis and Christian Aalborg, which are adapted for high speed service, have usually been raised and held in engagement with the trolley conductor by pneumatic pressure, the action of gravity being relied upon to lower the contact shoe when air was exhausted from the actuating cylinder. In the trolley above referred to, the lower extremities of the frame were pivotally mounted upon shafts which were relatively close together, the simultaneous movement of the two halves being effected by coöperating gear segments which were attached to the side rods of the frame.

According to my present invention, the shafts on which the frame is mounted are located a considerable distance apart and are rotatably mounted in sleeves or bearings of insulating material that are attached to the roof of the vehicle and a combination of crank levers and connecting links is employed for effecting the simultaneous action of the two halves of the frame. By locating the supporting shafts a considerable distance apart, a specially rigid structure is obtained and the mounting just described for the supporting shafts is simple and durable and at the same time suitably insulates the trolley structure from the surface upon which it is mounted. An air cylinder is also provided to which pneumatic pressure is applied for lowering the trolley, which is raised and held in engagement with the trolley conductor by spring pressure, and a latch is provided for holding the contact shoe down after it has been lowered by the fluid-pressure.

My invention is illustrated in the accompanying drawings in which—

Figure 1 is a side elevation of a trolley constructed in accordance therewith and Fig. 2 is a front elevation of the contact shoe of Fig. 1. Fig. 3 is a plan view and Fig. 4 a side elevation, on an enlarged scale, of portions of the apparatus shown in Fig. 1, both views being partially in section to disclose the supporting and actuating means. Fig. 5 is a plan view of the trolley shown in Fig. 1.

Referring to the drawings, the trolley illustrated therein comprises a double pantograph frame structure 1, the lower extremities of which are rigidly attached to a pair of supporting shafts 2 and 3, a sliding contact shoe 4 which is attached to and connects the upper extremities of the two parts of the frame 1, connecting rods 5 and 6 which are substantially parallel to the shafts 2 and 3 and form connecting pivots for the upper and lower halves of the frame structure at the side angles of the pantograph, one operating means for raising the contact shoe and another means for lowering it. The aforesaid operating means for lowering the shoe comprises a pneumatic cylinder 7, which is mounted upon the shafts 2 and 3 near their centers without preventing their rotation, a pair of similar piston rods 8 and 9 that are adapted to operate within the cylinder 7 to effect rotative movement of the shafts 2 and 3 and a plurality of crank levers 10, which are attached to the shafts 2 and 3 and are connected to the outer extremities of the rods 8 and 9 by links 11. Helical springs 12 encircle the piston rods 8 and 9 and are interposed between the respective ends of the cylinder 7 and the inner extremities of the piston rods, which are provided with flanges or enlargements to engage the spring ends. A pair of pistons 13 are adapted to operate within the cylinder 7, between the inner extremities of the piston rods 8 and 9, and a feed pipe 14 is provided near the middle of the cylinder through which fluid-pressure may be admitted between the pistons 13. When the fluid-pressure is sufficient to overcome the pressure of the helical springs 12, the pistons engage the inner extremities of the piston rods 8 and 9 and force them outwardly.

In order to effect simultaneous rotation of the shafts 2 and 3, crank levers 15 are rigidly attached thereto and are connected by links 16 and 17.

In order to make the pantograph frame structure particularly strong without making its weight prohibitive, tubes of steel or other conducting material of suitable strength may be used in its construction and each of the lower members of the frame may preferably comprise two tubes 18 and 19 which are fastened to the shafts 2 and 3 by clamping devices 20. The crank levers 11 and 15 are so arranged with reference to the rods 18 and 19 of the frame 1, that when the helical springs 12 are compressed and the piston rods 8 and 9 are forced out to the limit of their travel by fluid-pressure exerted upon the pistons 13, the frame 1 is collapsed and the sliding contact shoe 4 is moved vertically downward into engagement with the top of the cylinder 7; and when fluid-pressure is exhausted from the cylinder the action of the springs 12 forces the piston rods 8 and 9 toward each other and thereby so rotates the shafts 2 and 3 as to raise the contact shoe 4, in a substantially vertical plane, to the upper limit of its travel. The lengths of the several rods which are embodied in the frame structure are so arranged with reference to the height of the trolley conductor above the vehicle upon which the trolley is to be used, that when the contact shoe is in engagement with the trolley, the frame is never extended to the limit of its travel, this relation being provided in order that a relatively high degree of pressure may be exerted by the shoe against the trolley conductor.

The trolley structure is insulated from the roof of the vehicle, or any similar surface upon which it may be mounted, by a plurality of insulating sleeves 21 which serve as bearings for the shafts 2 and 3 and are located near the outer extremities of these shafts. The sleeves may be of considerable size and of suitable material to withstand the voltage strains to which they may be subjected, and bushings 22 of bearing metal, such as babbitt, may preferably be inserted so that the sleeves may be cast of relatively hard insulating material, such as glass or porcelain, without producing undue frictional wear upon the shafts. When a babbitt bushing is poured into a porcelain sleeve the sudden change in temperature often ruptures or cracks the sleeve and in order to avoid this difficulty the babbitt bushing may be poured into a gas pipe or similar tube of suitable dimensions which may then be cemented into the porcelain sleeve when cool. The sleeves 21 may be supported by brackets 23, which surround the sleeves and may be bolted or otherwise attached to the top of the vehicle.

Since the contact shoe is lowered by pneumatic pressure in the cylinder 7, it is desirable to provide a mechanical means for holding it down, in order to maintain it in such position in case the pressure becomes exhausted from the cylinder by leakage, or otherwise, when the vehicle was not in service. I have provided, therefore, a latch mechanism 24 which comprises a small cylinder 25 having a piston 26 and a piston rod 27 which is connected with a catch 28, a helical spring 29 being interposed between one end of the cylinder 25 and the piston 26 in order to hold the catch in its closed position unless fluid-pressure is admitted to the cylinder through an inlet pipe 30 to oppose the action of the spring and unlock the catch. A hook 31 is attached to the lower surface of the contact shoe 4 and is arranged to engage the catch 28 when the trolley frame is collapsed.

Assuming that the contact shoe is held in its lowest position by the engagement of the hook 31 with the catch 28 and it is desired to raise the contact shoe into engagement with the trolley conductor, fluid-pressure may first be admitted to the cylinder 25, through the inlet pipe 30, from an air reservoir carried by the vehicle or, if this is exhausted, sufficient pressure may be supplied to unlock the catch 28 by means of a small hand pump so that the vehicle driver or motorman may readily release the catch by the use of means located on the platform of the car. As soon as the hook 31 is released from the catch 28, the springs 12 raise the contact shoe into engagement with the trolley conductor. This arrangement has many advantages over those of the prior art in which fluid-pressure was required to raise the trolley and to hold it into engagement with the trolley conductor, since mechanical energy must always be applied to raise the contact shoe into engagement with the trolley conductor in case the storage cylinder became exhausted and the fluid supply could be restored to the tank only by the operation of the fluid pumps, that were usually driven by motors which received their energy from the trolley conductor.

I desire to include within the scope of my invention trolleys that embody variations in size, form and arrangement of details which do not materially change its mode of operation.

I claim as my invention:

1. A trolley for electric vehicles comprising a plurality of brackets, insulating sleeves or bearings supported thereby, a pair of substantially parallel shafts rotatably mounted in said bearings, a double pantograph frame attached to the extremities of the shafts, a contact shoe mounted upon the upper end of said frame, a spring-actuated device for expanding the frame and raising the contact shoe, pneumatic means for causing the frame to collapse and lower the contact shoe, and a pneumatically-actuated latch for holding the shoe in its lowest position.

2. In a trolley for electric vehicles, the combination with a plurality of brackets, insulating sleeves or bearings supported thereby, a pair of substantially parallel shafts rotatably mounted in said bearings, a double pantograph frame attached to the extremities of the shafts, a contact member mounted upon the upper end of said frame, and a spring-actuated device for expanding the frame and raising the contact shoe, of pneumatic means for causing the frame to collapse and lower the contact shoe, and a pneumatically-actuated latch for holding the shoe in its lowest position.

3. A trolley for electric vehicles comprising a plurality of brackets, insulating sleeves or bearings supported thereby, a pair of substantially parallel shafts rotatably mounted in said bearings, a double pantograph frame attached to the extremities of the shafts, a sliding contact shoe mounted on the upper end of said frame, a spring-actuated device for expanding the frame and raising the contact shoe, pneumatically-actuated means for collapsing the frame to lower the contact shoe, a spring latch for holding the shoe in its lowered position, and pneumatically-actuated means for actuating the latch to release the shoe.

4. A trolley for electric vehicles comprising a plurality of brackets, insulating sleeves or bearings supported thereby, a pair of substantially parallel shafts rotatably mounted in said bearings, a double pantograph frame attached to the extremities of the shafts, a contact member mounted on the upper end of said frame, a spring-actuated device for expanding the frame and raising the contact shoe, pneumatic means for collapsing the frame, and a pneumatically-released catch for holding the frame in its collapsed position.

5. A trolley for electric vehicles comprising a plurality of brackets, insulating sleeves or bearings supported thereby, a pair of substantially parallel shafts rotatably mounted in said bearings, a double pantograph frame attached to the extremities of the shafts, a sliding contact shoe mounted on the upper end of said frame, a spring-actuated device for expanding the frame and raising the contact shoe, and pneumatic means for causing the frame to collapse and lower the contact shoe.

6. A trolley for electric vehicles comprising a plurality of brackets, insulating sleeves or bearings supported thereby, a pair of substantially parallel shafts rotatably mounted in said bearings, a double pantograph frame attached to the extremities of the shafts, a contact member mounted on the upper end of said frame, a spring-actuated device for expanding the frame and raising the contact shoe, and pneumatic means for causing the frame to collapse and lower the contact shoe.

7. In a trolley for electric vehicles, the combination with a plurality of brackets, insulating sleeves or bearings supported thereby, a pair of substantially parallel shafts rotatably mounted in said bearings, a double pantograph frame attached to the extremities of the shafts, springs for expanding said frame, and a contact shoe mounted on the upper end of said frame, of pneumatic means for causing the frame to collapse and lower the contact shoe.

8. The combination with a contact member and a pantograph supporting frame therefor, of spring-actuated means for expanding said frame, pneumatically-actuated means for collapsing the frame and a pneumatically-released latch for holding the frame in its collapsed position.

In testimony whereof, I have hereunto subscribed my name this 9th day of January, 1906.

THEODORE VARNEY.

Witnesses:
H. A. MULLETT,
BIRNEY HINES.